Sept. 13, 1949.　　　R. P. BROOKS　　　2,481,975
BAIT RETRIEVER
Filed Feb. 9, 1948
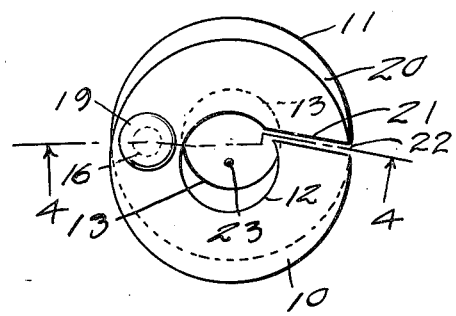
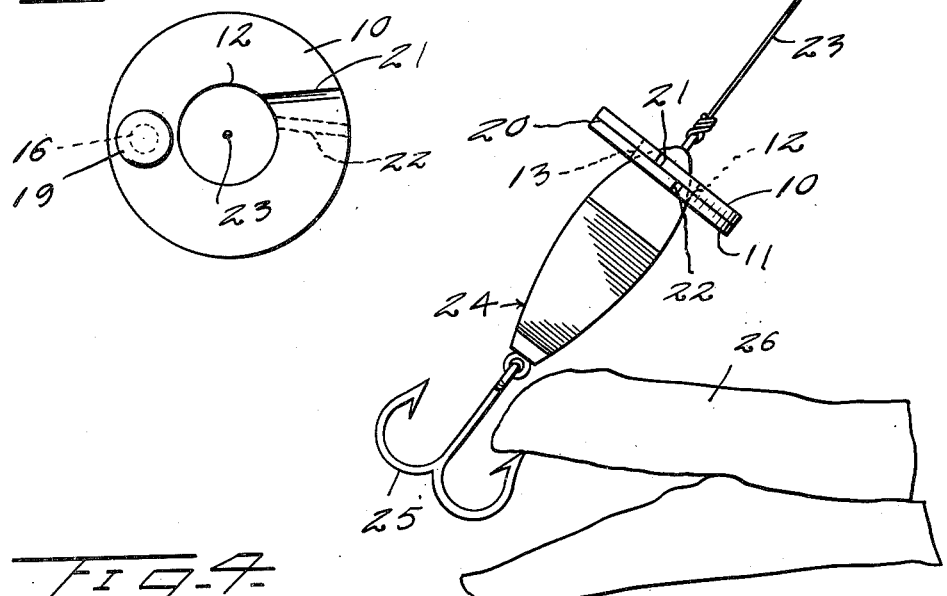
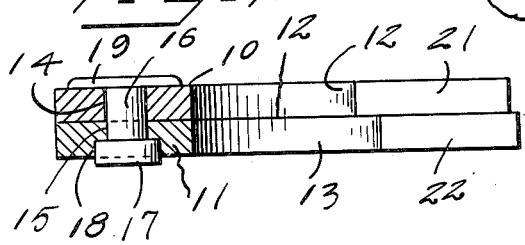
Inventor
R. P. Brooks
By
Kimmel & Crowell Attys.

Patented Sept. 13, 1949

2,481,975

UNITED STATES PATENT OFFICE 2,481,975

BAIT RETRIEVER

Richard Preston Brooks, Longview, Tex.

Application February 9, 1948, Serial No. 7,101

6 Claims. (Cl. 43—30)

My invention relates to fishing equipment and more particularly to a bait retriever in the form of a weighted ring adapted to be slipped over or on a fishing line and dropped to slide down the line and sink into the water to and against the hook or artificial bait or lure having hooks attached thereto, so that by jerking lightly on the line or with the help of the fishing rod or pole in circling or encircling the line around the point at which the hook is caught or causing the ring to act as a hammer, the hook may be released and disengaged from an object on which it is caught to permit retrieving of the hook and bait or lure.

Another object is to provide a retriever for releasing the bait and hook or the hooks of an artificial bait or lure from logs, branches of trees, rocks or other undergrowth or obstructions in the water or bed of a stream in which the hook is caught while fishing, to avoid loss thereof.

A further object of the invention is to provide a simple, novel and inexpensive bait, lure or artificial bait and hook retriever of the character stated comprising a plurality, preferably a pair of annular members or rings pivoted together for limited movements relative to each other into and out of aligned positions and having slits cut through the annular walls thereof which are out of registry or offset circumferentially relative to each other when the rings are in mating or aligned positions, but placed in alignment when the rings are moved relatively out of alignment, so as to permit the device to be slipped on the line. The rings are then moved into alignment or mating positions to disalign the slots or move them out of registry so that the slots of both rings are closed off by the adjacent wall portions of the opposite rings to prevent the device from slipping off of the line when dropped to slide down the line to the bait, lure or hook to facilitate releasing the latter as heretofore pointed out.

With the above and other objects in view, my invention consists in the arrangement, combination and details of construction disclosed in the drawing and specification, and then more particularly pointed out in the appended claims.

In the drawing,

Figure 1 is a plan view of the retriever with the annular members composing the same moved out of alignment to dispose the slots thereof in registry so that the device may be slipped onto a line, Figure 2 is a view similar to Figure 1 with the member in alignment and the slots out of registry to prevent displacement of the device from the line, Figure 3 is an elevation showing the retriever in position when employed to release the line and hook; and Figure 4 is an enlarged sectional view taken on the line 4—4 of Figure 1.

Referring to the drawing the retriever is shown as comprising a plurality, preferably a pair of annular members or rings 10 and 11, preferably of metal and flat like washers. These rings are each provided with central openings 12 and 13 respectively, shown of circular form. The rings 10 and 11 are provided with holes 14 and 15 to receive a pivot 16 therethrough, the pivot being fixed to one ring as by the headed or squared rivet end 17 which in this instance is shown enlarged as seen in Figure 4 to engage a corresponding recess 18 in the ring 11. The opposite end of the pivot may be provided with a flanged head 19 so that the rings are retained together and frictionally pivoted with one of the rings such as the ring 10 adapted to turn on the shank of the pivot 16 while the ring 11 held fixed or stationary.

When thus secured together for pivotal movement relatively in substantially parallel planes, the coacting inner surfaces 20 of the rings are frictionally engaged. The ring 10 is provided with a diagonal slit or slot 21 cut through its annular wall from the outer periphery thereof to the central opening 12 and offset circumferentially relative to the pivot or from a diametrical line drawn from the center of the pivot 16 through the center of the ring 10 and opening 12. The ring 11 is provided with a similar diagonal slit or slot 22 disposed slightly out of alignment or off center with respect to a diametrical line from the center of the pivot 16 through the center of the opening 13 and ring 11. By this means, the slots are normally disposed out of registry or alignment and offset circumferentially relative to each other when the rings are in aligned position as shown in Figure 2 of the drawing, but placed in alignment when the rings are moved or pivoted relatively out of alignment as shown in Figure 1 of the drawing, so as to permit the fishing line 23 to be passed through the slots or the device slipped over or onto the line. The rings are then moved into alignment or mating position to disalign or dispose the slots out of registry so that the slots of both rings are closed off by the adjacent annular wall portions of the opposite rings to prevent the device from slipping off of the fishing line and retaining it thereon when the device is dropped to slide down the line and sink into the water to the bait, lure or hook to facilitate releasing the latter.

In Figure 3 of the drawing, the device is shown applied to the line in the manner described and dropped down against the head or lead end of an artificial bait or lure 24 having hooks 25 caught in obstructions 26 which as previously stated, may be logs, branches of trees, rocks or other obstructions or undergrowth in the water or bed of the stream in which the hooks 25 attached to the line 23 may be snagged or caught. The retriever being larger in diameter than the lure, will project outwardly of the lure and hooks to shield the same and provide clearance therefor when released or freed from the obstruction and pulled in. Thus it will be seen that by jerking lightly on the line or with the help of the fishing pole or rod in circling or encircling the line around the point at which a hook is snagged or caught, the ring is caused to act as a hammer and dislodge the lure and hooks downwardly and laterally from the object on which they are caught, so as to be easily released from such object to permit retrieving of the line and hook and artificial bait or lure attached thereto whereby loss of same is prevented.

I do not mean to confine myself to the exact details of construction herein disclosed but claim all variations falling within the purview of the appended claims.

What I claim is:

1. A bait retriever comprising a plurality of washer-like members connected for movement relative to each other in substantially parallel planes and having slots through the walls thereof offset circumferentially from each other and disposed out of registry when the members are in one position and into registry when the members are in another position.

2. A bait retriever comprising a plurality of annular washer-like members pivotally connected through their annular walls for movement relative to each other in substantially parallel planes into and out of alignment and having diagonal slots through the annular walls thereof disposed out of registry when the members are aligned and moved into registry when the members are moved out of alignment.

3. A bait retriever comprising a pair of flat annular ring members frictionally pivoted for movement relative to each other into and out of alignment and having slits through the annular walls thereof offset circumferentially relative to the pivot and each other and disposed out of alignment when the members are in mating position and moved into alignment when the members are moved out of mating position.

4. A bait retriever comprising a pair of rings pivotally connected for frictional movement on each other to positions into and out of alignment, said rings having each a slot through the annular wall thereof disposed off center with respect to a diametrical line through the centers of the pivot and rings and out of alignment when the rings are in aligned positions and disposed in alignment when the rings are moved out of aligned positions to permit the entrance of a fishing line therethrough into the central openings of the rings.

5. A bait retriever comprising a pair of flat annular members having circular central openings and holes through the annular walls thereof, a pivot extending through said holes and anchored to one member to pivotally connect the members for frictional movement on each other and limited to positions into and out of alignment, said members having slots through the annular walls thereof disposed off center at different degrees with respect to a diametrical line from the pivot across the centers of the openings and out of registry when the members are aligned and moved into registry and when the members are moved out of alignment.

6. A bait retriever comprising a pair of washer-like members pivotally connected for movement relative to each other in substantially parallel planes and having slots through the walls thereof offset circumferentially relative to the pivot and each other and disposed out of alignment when the members are in alignment and in alignment when the members are out of alignment.

RICHARD PRESTON BROOKS.

REFERENCES CITED

The following references are of record in the file of this patent:

UNITED STATES PATENTS

| Number | Name | Date |
| --- | --- | --- |
| 543,975 | Ball | Aug. 6, 1895 |
| 2,385,415 | Jackson | Sept. 25, 1945 |
| 2,406,252 | Potter | Aug. 20, 1946 |